United States Patent [19]
Young

[11] Patent Number: 4,648,557
[45] Date of Patent: Mar. 10, 1987

[54] TRANSPORT SYSTEM FOR MATERIAL IN POWDER OR LIKE FORM

[75] Inventor: Michael J. R. Young, Ashburton, England

[73] Assignee: General Dispensing Systems Limited, London, England

[21] Appl. No.: 737,350

[22] PCT Filed: Oct. 4, 1984

[86] PCT No.: PCT/GB84/00337
§ 371 Date: May 16, 1985
§ 102(e) Date: May 16, 1985

[87] PCT Pub. No.: WO85/01494
PCT Pub. Date: Apr. 11, 1985

[30] Foreign Application Priority Data
Oct. 4, 1983 [GB] United Kingdom ............... 8326533

[51] Int. Cl.⁴ .................................................. B05B 3/14
[52] U.S. Cl. ................................ 239/102.2; 198/750; 222/200; 239/659

[58] Field of Search ............... 239/659, 102; 222/199, 222/200; 198/750, 771, 761, 762, 766, 768–770; 141/67

[56] References Cited
U.S. PATENT DOCUMENTS

| | | | |
|---|---|---|---|
| 2,568,332 | 9/1951 | Genovese | 222/199 |
| 3,114,654 | 12/1963 | Nishiyama et al. | 239/704 |
| 3,243,122 | 3/1966 | Snaper | 239/102 |
| 3,400,892 | 9/1968 | Ensminger | 239/102 |
| 3,727,801 | 4/1973 | Caridis et al. | 239/659 |
| 3,986,669 | 10/1976 | Martner | 239/102 |

*Primary Examiner*—Jeffrey V. Nase
*Assistant Examiner*—Daniel R. Edelbrock
*Attorney, Agent, or Firm*—Scrivener and Clarke

[57] ABSTRACT

There is disclosed a transport system for material in powdered, particulate, granular or the like form. A generally horizontal flow channel extends from an inlet (20) to an outlet (11) for the material. An ultrasonic standing wave is set up in the body (10) surrounding the flow channel by means of a piezo-ceramic transducer (12). The standing wave is arranged to have an antinode at or near the inlet and a node at or near the outlet whereby the material flows along the channel.

6 Claims, 9 Drawing Figures

TRANSPORT SYSTEM FOR MATERIAL IN POWDER OR LIKE FORM

This invention relates to a transport system for material which is in powdered, particulate, granular or the like form. The invention has particular, but not sole, application to devices which dispense powders and the like in drinks dispensing machines.

Conventionally hitherto in drinks dispensing machines, auger feed mechanisms have been employed to transfer freeze dried material from a hopper to a mixing chamber. Such mechanisms do not dispense an accurate dose of material because the volume of material transferred in a given interval of time depends upon the speed of the auger motor and on the flow of material within the hopper. The motor speed fluctuates with the load on the auger such that the dose of material varies with hopper content.

It is an object of the invention to provide a transparent system which in operation transports an accurately controllable quantity of material which is in powdered, particulate, granular or the like form, and which transport system may be employed to dispense and accurate dose of material for example in drinks dispensing machnes.

In accordance with this invention, there is provided a transport system for material in powdered, particulate, granular or the like form, comprising a body provided with a flow channel for the material, the channel being generally horizontal in use, and having an inlet for receiving said material and, spaced from said inlet, an outlet for dispensing said material, and an ultrasonic transducer coupled to said body and arranged to establish an ultrasonic standing wave effective to displace material along said flow channel from said inlet to said outlet.

Embodiments of the invention will now be more particularly described by way of example and with reference to the accompanying drawings, in which.

Figure 1:
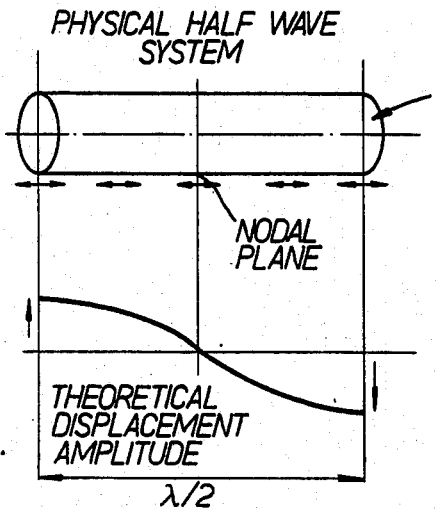
FIG. 1 is a schematic illustration, for explaining the principles of operation underlying the invention, of a body in the form of a cylindrical rod in which an ultrasonic standing wave is established.

Referring to FIG. 1, there is shown a body 1 in the form of a cylindrical rod and in which a standing compression wave is established by means of an ultrasonic transducer (not shown) coupled to the rod. The length of the rod is equal to one half of the wavelength $\lambda$ of the standing wave with the vibration amplitude being a maximum at each end (antinodes of the standing wave) and a minimum at the central nodal plane, as schematically shown in FIG. 1 below the rod 1. A particle resting on the rod surface would be excited to vibrate at an amplitude of the standing wave at that point of the length of the rod. Movement of the particle towards either free end of the rod would require an increase in particle amplitude, whilst movement towards the node would permit a decrease in particle amplitude. Thus free particles, seeking naturally the lowest energy state, move towards the nodal plane.

Figure 2:
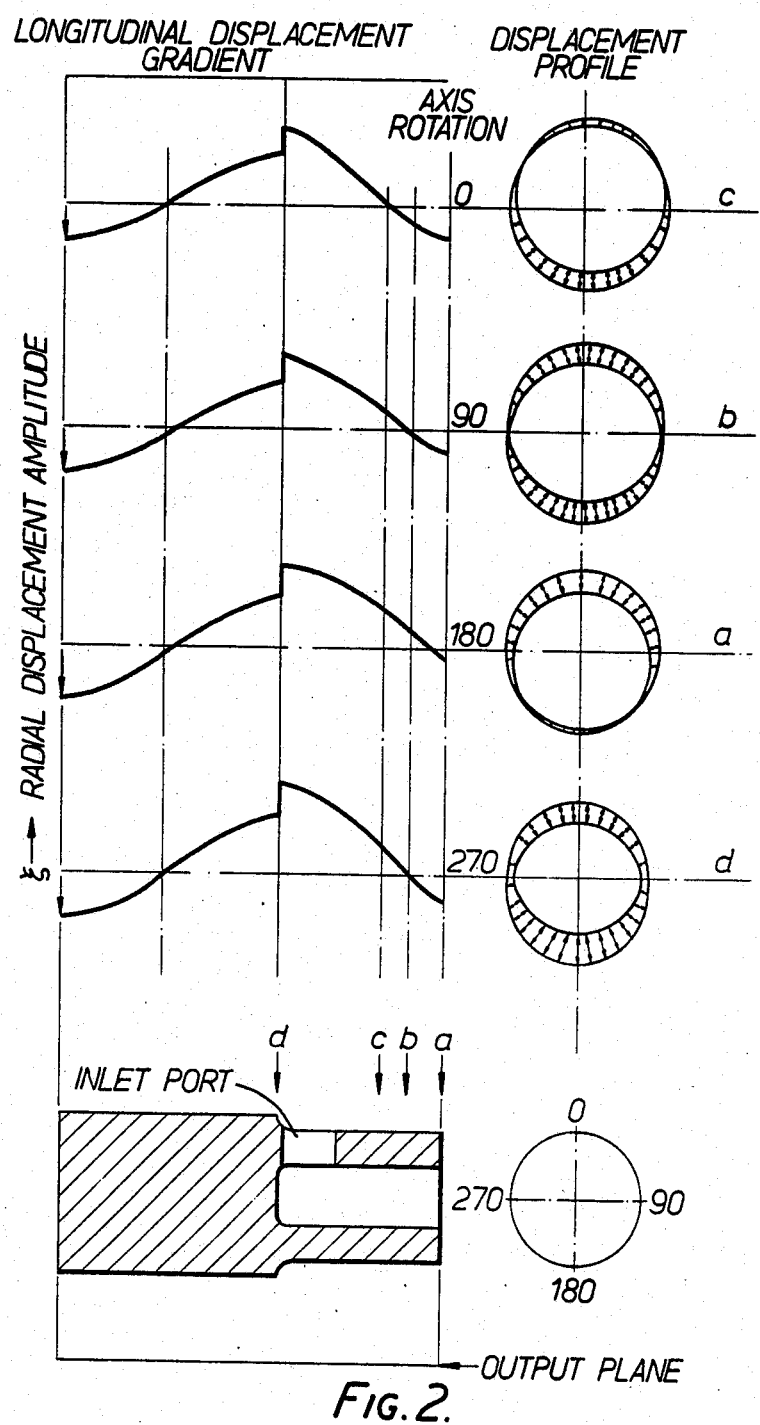
FIG. 2 is to illustrate qualitatively radial/flexural displacement amplitude in a stepped horn with a hollow output section.

FIG. 2 shows a stepped horn with a hollow output end, designed primarily as a quarter wave stepped velocity transformer having a hollow output section. The overall length of the horn is equal to a half wavelength for the selected material and frequency.

In addition the inner and outer diameters are chosen so that the mean circumference of the hollow output end is close to a half wavelength. This ensures the presence of complex radial/flexural waveforms which are necessary to provide the correct amplitude distribution in the output end of the horn.

The amplitude distribution in the horn has been qualitatively assessed using two piezo-ceramic sensors. The characteristics in a series of schematic displacement profiles taken at intervals along the horn are shown in FIG. 2. A maximum radial amplitude is present at the step, d, decreasing to a minimum value near the output end, a. The longitudinal position of the flexural node in the output end varies around the horn circumference and is almost coincident with the output face at 180 degrees from the inlet orifice.

The size and position of the inlet port has a fundamental effect on the flexural displacement amplitude distribution at the output end of the horn. This can be seen clearly in the relevant cross-section displacement profile in FIG. 2. This results in an almost ideal displacement gradient in the lower half of the horn output end. The exact reasons for the property are not fully understood, but it is thought to be caused by the tube surface discontinuity constituted by and around the inlet opening.

In addition to the flexural waveform there is present of course a significant longitudinal standing wave. However displacements normal to the horn surface appear to be more effective in moving particulate material than equivalent displacements parallel to the horn surface. The net result of the measured displacement gradient in the hollow output end produces a significant force impelling the contents of the horn to move from the inlet port towards the output plane and to project the material some distance beyond that point.

Referring now to FIG. 3, there is shown a powder dispenser having an aluminium alloy body 10 in the form of a stepped horn, to one end of which is coupled an ultrasonic transducer 12, the other end of the horn being open to provide a dispensing outlet 11. The transducer 12 comprises two piezo-ceramic crystals sandwiched between an aluminium alloy member 14 and a mild steel member 16, an axial bolt 17 serving to clamp the two cylindrical members together and a threaded, high tensile steel stud 18 serving to couple the member 14 to that end of the body 10 which has the greater outer diameter and smaller inner diameter. A frusto-conical aluminium insert 20 has its lower, narrower end located within an aperture in the lesser outer-diameter portion of the horn just adjacent the central step and a hopper 22 (formed of thin aluminium) is located in the upper end of insert 20.

The ultrasonic transducer establishes a standing wave in the horn in accordance with the principles outlined above. The wave has a flexural antinode at the location of the step and a node at the outlet end of the horn, and indeed the overall length of the horn is one half the wavelength of the standing wave. The axial length of member 14 represents one quarter wavelength of the wave as transmitted through that member. The standing wave promotes flow of powder along the axial channel within the horn, from the inlet to the dispensing outlet. The ultrasonic vibrations also facilitate powder flow in the hopper and prevent "bridging". The dose of powder transported along the flow channel and dispensed from the outlet is accurately related to the power applied to the ultrasonic transducer and the time duration of the power application. The dose can accordingly be repeated accurately or selected accurately.

Figure 3:
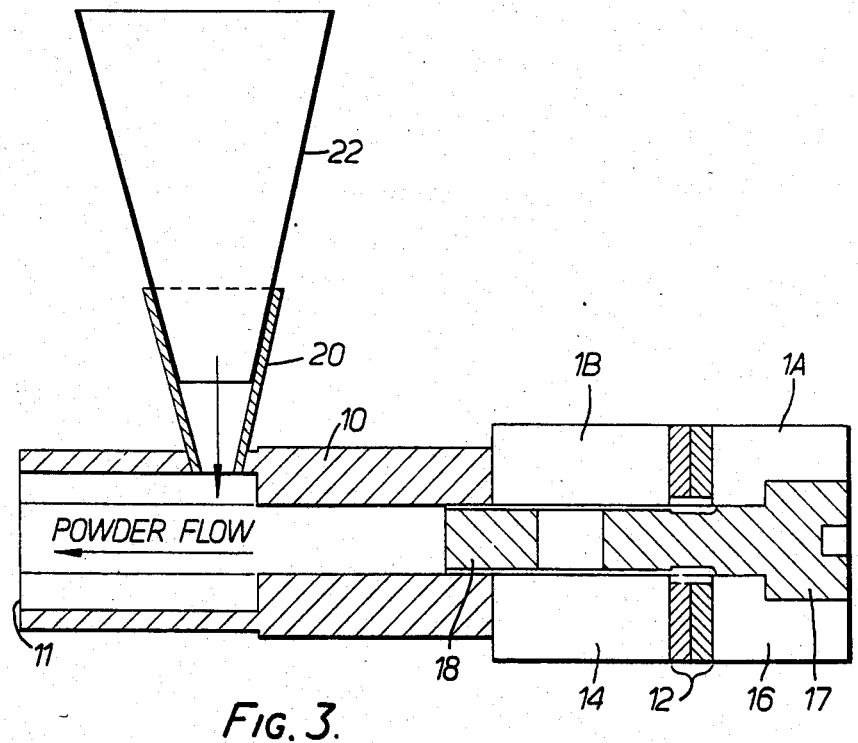
FIG. 3 is a longitudinal, vertical section through a first embodiment of powder dispenser in accordance with this invention.
Figure 4:
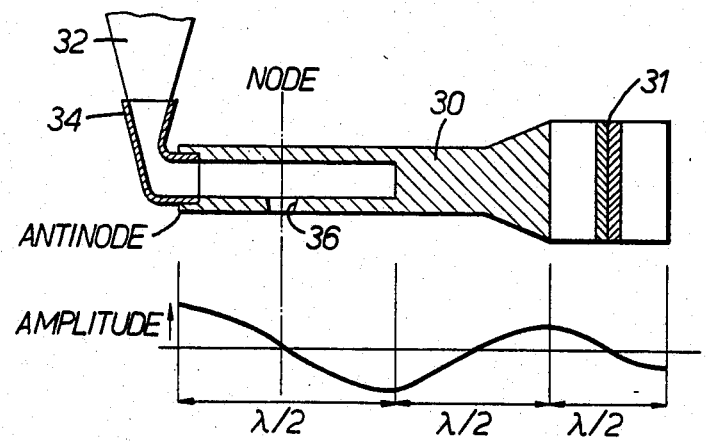
FIG. 4 is a longitudinal, vertical section through a second embodiment of powder dispenser in accordance with this invention.

In the dispenser of FIG. 4, a body 30 is provided with a tubular portion of diameter significantly less than half a wavelength and a tapering horn portion for coupling to a sandwich transducer 31 similar to that shown in FIG. 3. A hopper 32 is coupled into the open end of the tubular portion by a transition insert 34 and an outlet aperture 36 is provided half-way along the tubular portion. The transducer establishes a compressional standing wave in the body 30, with an antinode at the hopper-end of the tubular portion and a node at the outlet 36. In the arrangement shown, body 30 has a length equal to one wavelength of the standing wave, the tubular portion having an overall length of one half wavelength.

Figure 5:
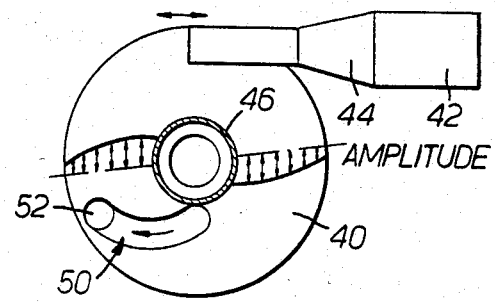
FIG. 5 is a section on the line V—V of FIG. 6 showing in plan view a third embodiment of dispenser.
Figure 6:
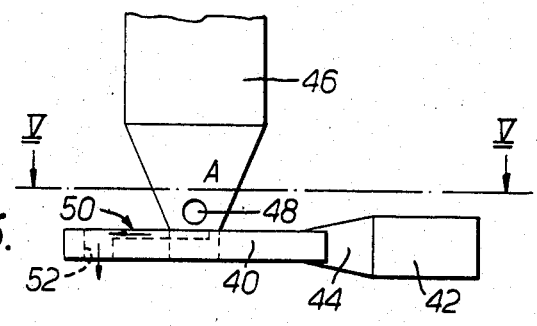
FIG. 6 is a vertical section through the third embodiment of powder dispenser.

In the dispenser of FIGS. 5 and 6, a horizontal disc shaped body 40 is provided and a torsional mode standing wave is established therein by a transducer 42, coupling being effected by a horn 44 connected tangentially to the body 40. A hopper 46 is mounted on the upper side of body 40 with the centre of the latter on the axis of the hopper. An aperture 48 is provided in the wall of the hopper, at its lower end, for powder to flow into a grooved channel 50 machined in the upper side of body 40. This channel 50 extends in an arc generally radially outwardly to a dispensing outlet aperture 52 formed through the body 40.

Figure 7:
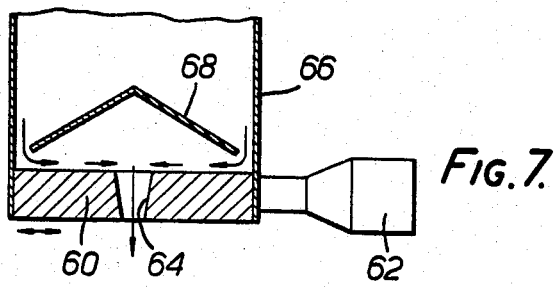
FIG. 7 is a vertical section through a fourth embodiment of powder dispenser.

In the dispenser of FIG. 7, a disc shaped body 60 is vibrated in a radial mode by a transducer 62, to promote flow of powder radially inwardly over its upper side to a central dispensing outlet 64. Body 60 forms the bottom of a cylindrical hopper 66. A radial flow channel for the powder is provided under a conical baffle 68 mounted above the body 60 with clearance around its rim both from the inner surface of the hopper and the upper side of body 60.

Figure 8:
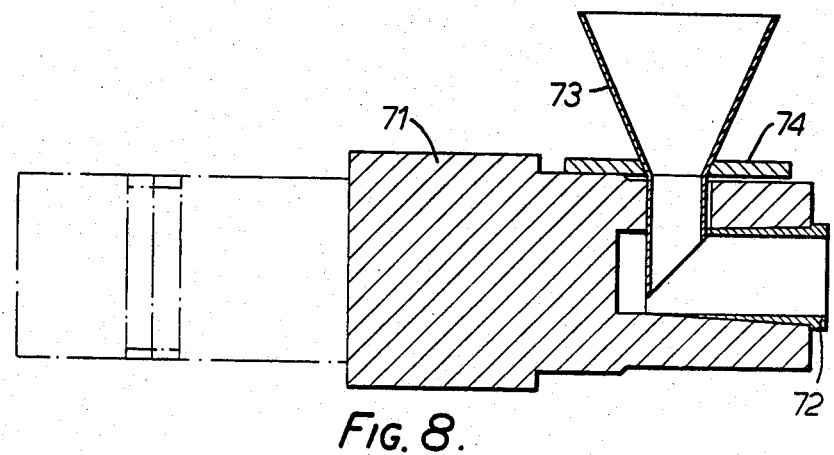
FIG. 8 is a vertical longitudinal section through a fifth embodiment of powder dispenser.
Figure 9:
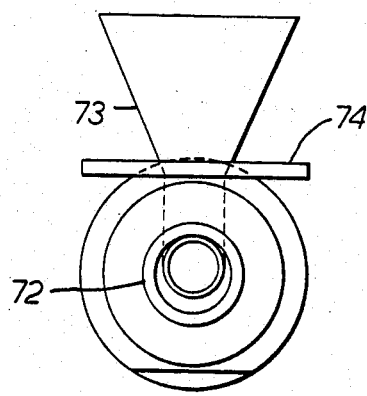
FIG. 9 is an end elevation of the dispenser shown in FIG. 8.

A further embodiment of ultrasonic dosing system is illustrated in FIGS. 8 and 9. It embodies the general principles discussed above but in addition incorporates one modification.

The internal diameter of the horn 71 has been machined with a small taper, for example of 1.5 degrees, and fitted with a stainless steel sleeve 72 machined with a matching taper.

Two functions are served by the tapered sleeve 72 which is pressed into the bore of the horn output end. Firstly, since the sleeve is tapered only on the external surface, the wall thickness varies, being a maximum at the output end and reducing almost to nothing close to the inlet port. The horn 71 is machined from an aluminium based alloy having a lower density and Young's modulus than that of stainless steel. The effect of this relatively stiff lining is to differentially reduce the flexural displacement causing a more rapidly decreasing gradient as the output plane is approached. As an alternative, the stainless steel could be replaced by other material of equivalent properties, for example bronze or tungsten carbide. A second function of the stainless steel surface is that it readily accepts a high polish which enhances powder flow.

In this embodiment a truncated hopper 73 is attached by a circular plate 74 close to the longitudinal node in the solid input end of the horn. The short hopper 73 fitted to the inlet port is designed to interface with a larger hopper (not shown) which is not necessarily vibrated.

EXAMPLE

The flow rates achieved using the doser shown in FIGS. 7 and 8 to transport some of the most commonly dispensed products have been measured and the performance figures are summarised in Table 1 below.

TABLE 1

| Product | Product Density (g/cc) | Flow Rate (g/sec.) |
| --- | --- | --- |
| Powdered drinking chocolate | 0.65 | 12–15 |
| Powdered instant tea | 0.115 | 3–3.5 |
| Powdered non-dairy whitener | 0.75 | 20–25 |
| Granular instant coffee | 0.22 | 3–4 |

The highest flow rates, as might be expected, are achieved with the higher density powders. The flow rate is generally proportional to the square of the density rather than directly proportional to density. Volume flow is therefore also a function of density. This might be explained by the anticipated increased coupling between the powder and horn which is achieved with the denser materials. In more fundamental terms the kinetic energy of particulate matter is a function of mass and velocity and therefore for a given velocity amplitude, associated with a particular location within the horn, the driving force impelling particles to move towards regions of lower amplitude will be greater for particles of higher density.

The transport systems which have been described have the advantages of high speed of transfer of the powder or other material and an accurate control of the amount of material transferred. It is also an advantage that the dispensing outlet is spaced from the hopper outlet. Furthermore, the systems have no moving parts and high reliability and low maintenance costs.

I claim:

1. A transport system for material in powdered, particulate, granular or the like form, comprising a body; flow channel means for guiding the material, said channel means being within the body, and in use, generally horizontally disposed; an inlet to said channel means for receiving said material; said channel means terminating at an outlet from said channel means for dispensing said material; said outlet being spaced from said inlet; and an ultrasonic transducer coupled to said body and arranged to establish an ultrasonic standing wave having a node substantially at the outlet, and an antinode substantially at the inlet, so as to displace material along said channel means from said inlet to said outlet, said inlet and outlet being spaced one from the other substantially by one quarter of a wavelength of the ultrasonic standing wave.

2. A transport system as claimed in claim 1, wherein said body is annular in cross section having inner and outer circumferences, the mean of said inner and outer circumferences of the body surrounding the outlet being substantially one half of a wavelength of the ultrasonic standing wave.

3. A transport system as claimed in claim 1, wherein the body comprises a stepped horn, and said ultrasonic transducer comprises a piezoceramic sandwich transducer arranged to excite said horn to produce a standing wave therein.

4. A transport system as claimed in claim 1, wherein said material is gravity fed to the inlet from a storage hopper.

5. A transport system as claimed in claim 1, wherein the flow channel means is provided with an insert extending substantially between said inlet and outlet, said insert being of a material having a higher density and higher Young's modulus than the material of the body.

6. A transport system as claimed in claim 5, wherein the insert is externally tapered to a maximum wall thickness at the outlet and said channel means is complementarily tapered.

* * * * *